(12) United States Patent
Snape et al.

(10) Patent No.: US 9,874,147 B2
(45) Date of Patent: Jan. 23, 2018

(54) V-BAND CLAMP WITH INTEGRAL MOUNT PLATE

(71) Applicant: United Technologies Corporation, Hartford, CT (US)

(72) Inventors: Nathan Snape, Tolland, CT (US); Matthew J. Howlett, North Haven, CT (US); Steven Dill, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 152 days.

(21) Appl. No.: 14/600,771

(22) Filed: Jan. 20, 2015

(65) Prior Publication Data
US 2016/0208706 A1   Jul. 21, 2016

(51) Int. Cl.
| | | |
|---|---|---|
| *F02C 7/20* | (2006.01) | |
| *F16M 13/02* | (2006.01) | |
| *F16B 2/08* | (2006.01) | |
| *F01D 25/28* | (2006.01) | |
| *F02C 7/32* | (2006.01) | |
| *F02C 7/14* | (2006.01) | |
| *F16L 23/14* | (2006.01) | |

(52) U.S. Cl.
CPC .............. *F02C 7/20* (2013.01); *F01D 25/28* (2013.01); *F02C 7/14* (2013.01); *F02C 7/32* (2013.01); *F16B 2/08* (2013.01); *F16M 13/02* (2013.01); *F05D 2260/30* (2013.01); *F05D 2260/39* (2013.01); *F16L 23/14* (2013.01)

(58) Field of Classification Search
CPC . F16L 23/08; F16L 23/14; F16L 23/04; F16L 23/003; F16L 23/06; F16L 23/006; F16L 23/10; F05D 2260/39; F02C 7/20; Y10T 24/1451; Y10T 24/1453
See application file for complete search history.

(56) References Cited

U.S. PATENT DOCUMENTS

| | | | |
|---|---|---|---|
| 3,464,722 A * | 9/1969 | Larkin | F16L 23/10 24/284 |
| 7,013,651 B2 | 3/2006 | Bruno et al. | |
| 8,657,255 B2 | 2/2014 | Goodman et al. | |
| 2011/0277466 A1 | 11/2011 | Danielewicz et al. | |
| 2013/0249212 A1* | 9/2013 | McKiernan | F16L 23/10 285/407 |

FOREIGN PATENT DOCUMENTS

FR          2856735 A1     12/2004

OTHER PUBLICATIONS

Extended European Search Report for EP Application No. 16151802.2, dated Jun. 8, 2016, 8 pages.

* cited by examiner

*Primary Examiner* — Robert Sandy
*Assistant Examiner* — Michael S Lee
(74) *Attorney, Agent, or Firm* — Kinney & Lange, P.A.

(57) ABSTRACT

A V-band clamp includes a V-band segment that has a V-groove and is configured to generally circumscribe a flange of a first component and a flange of a second component. The V-band segment has a coupling element that is configured to couple the V-band clamp to a third component. The V-band clamp also has a latch disposed on the V-band segment that is configured to tighten the V-band clamp about the flanges.

7 Claims, 5 Drawing Sheets

V-BAND CLAMP WITH INTEGRAL MOUNT PLATE

BACKGROUND

This application is directed to securing flanged components to each other and coupling those components to another structure. More particularly this application is directed to using V-band clamps to mount components to a structure.

When two flanged components are engaged with each other it is often necessary to ensure that a good seal is created at the interface of the respective flanges. A V-band clamp can be used for this purpose. Once the flanged components are secured to each other, it may be necessary to attach those components to another structure. This can be a challenge when the flanged components must be installed on a structure having a cluttered environment around the attachment site thereby making it difficult and time consuming to properly install or remove the components on the structure. Additionally the flanged components may be very heavy, which can make it difficult to properly position the components on the structure. Accordingly, there is a need for a device that simplifies the process of sealingly engaging two flanged components and attaching those components to another structure.

SUMMARY

A V-band clamp includes a V-band segment that has a V-groove and is configured to generally circumscribe a flange of a first component and a flange of a second component. The V-band segment has a coupling element that is configured to couple the V-band clamp to a third component. The V-band clamp also has a latch disposed on the V-band segment that is configured to tighten the V-band clamp about the flanges.

A mount plate includes an integral V-band that defines a V-groove that is configured to receive a first portion of a flange that belongs to a first component. The V-groove is also configured to receive a first portion of a flange belonging to a second component. The mount plate also includes a mount surface that extends from the integral V-band. The mount surface is configured to at least partially support the first component.

A method for removably securing a first component to a second component includes the step of positioning a first portion of a flange belonging to a first component at least partially within a V-band segment. A first portion of a flange belonging to a second component is then positioned at least partially within the V-band segment. A V-band segment is then positioned about a second portion of the flanges belonging to the first and second components in which the V-band segment forms a V-band clamp. The V-band clamp is then tightened. The V-band clamp is then mounted to a third component.

DETAILED DESCRIPTION

Disclosed herein is a V-band clamp that is configured to join a first component to a second component. Also disclosed herein is a mount plate that includes an integrated V-band. Further disclosed herein is a method for removably securing a first component to a second component. Features of each disclosure in this application and the claims that follow will become apparent to a person skilled in the art reading the detailed description along with references to the drawings contained in this application.

Figure 1:
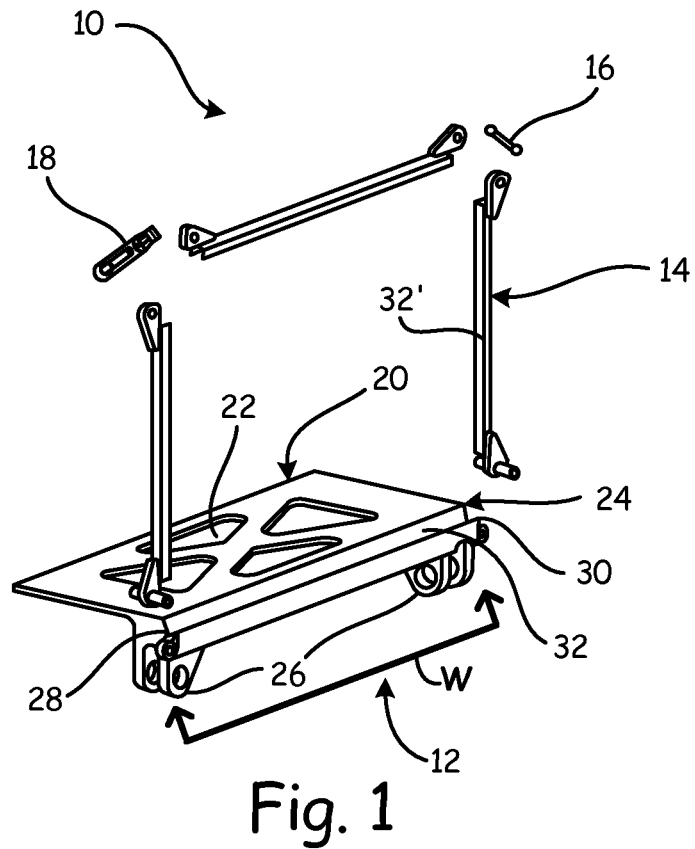
FIG. 1 is an exploded view of a V-band clamp according to an embodiment of the invention.

FIG. 1 shows an exploded view of an embodiment of V-band clamp 10. V-band clamp 10 includes mount plate 12, V-band segments 14, link 16, and latch 18. Mount plate 12 includes mount surface 20, cutouts 22, integrated V-band 24, and mount plate devises 26. Integrated V-band 24 includes first end 28 and second end 30 and defines V-groove 32. V-band segments 14 define V-groove 32'.

Mount plate 12 is a load bearing structure and can be machined or forged from steel or from an alloy such as a nickel or a chromium based alloy. Mount plate 12 includes mount surface 20 which provides a surface to position a component on. Mount surface 20 is a planar load-bearing structure in this embodiment but can take on other shapes as well, such as a semi-circular shape or a triangular shape. Mount surface 20 includes four cutouts 22. Cutouts 22 can be machined out of mount surface 20 or formed during forging of mount plate 12. Cutouts 22 are an optional feature in mount plate 12 and can reduce the overall weight of V-band clamp 10 which may be desirable in the aerospace industries, for example. Proximate to mount surface 20 on mount plate 12 is integrated V-band 24.

Integrated V-band 24 spans between first end 28 and second end 30. First end 28 and second end 30 define a width w of mount plate 12. Integrated V-band 24 defines V-groove 32 in mount plate 12. Integrated V-band 24 is configured to receive two mating flanges which, together, form a V-flange. The dimensions of integrated V-band 24 can conform to the dimensions of any V-flange or to an industry standard V-flange. In this embodiment, integrated V-band 24 is positioned at an edge of mount plate 12. In other embodiments of mount plate 12, integrated V-band 24 could be positioned elsewhere without departing from the scope of the invention. As an example, integrated V-band 24 could be positioned in the middle of mount plate 12. That would allow mount plate 12 to provide a surface supporting two components.

Mount plate devises 26 are positioned below first end 28 and second end 30 of integrated V-band 24. Mount plate devises 26 can be used to attach mount plate 12, and thereby V-band clamp 10, to a third component such as a gas turbine engine core. Mount plate devises 26 can also be placed in other locations on mount plate 12. Besides mount plate devises 26 other elements could be used to couple mount plate 12 to a third component. Mount plate 12 could include tabs or a flange which can act as coupling elements. These elements can also be attached to V-band segments 14 if V-band clamp 10 does not include mount plate 12.

V-band segments 14 can be formed from sheet metal or forged from an alloy amongst other compositions. V-band segments 14 define V-groove 32'. V-groove 32' has dimensions that match those of V-groove 32. V-band segments 14 are attached to mount plate 12 adjacent to first end 28 and second end 30 of integrated V-band 24 such that V-grooves 32 and 32' are aligned. V-band segments 14 can be attached to mount plate 12, for example, by bolting them to mount plate 12. In FIG. 1 three V-band segments 14 are shown. V-band segments 14 can be attached to each other using link 16 and/or latch 18. Although in FIG. 1 link 16 and latch 18 are shown to connect V-band segments 14, link 16, and latch 18 can also be used to connect V-band segments 14 to mount plate 12.

Link 16, as shown in FIG. 1, secures adjacent V-band segments 14 to each other. Link 16 can be bolted to adjacent ends of V-band segments 14. Link 16 can also be bolted to adjacent ends of V-band segment 14 and mount plate 12. The connection formed by link 16 allows linked V-band segments 14 to hinge with respect to each other. Although one link 16 is shown with respect to FIG. 1, multiple links 16 could be used with V-band clamp 10 depending on how many V-band segments 14 are included in V-band clamp 10. Link 16 is not designed to removably secure the components of V-band clamp 10 together; latch 18 is used for that purpose.

As shown in FIG. 1, latch 18 can be disposed between adjacent ends of two V-band segments 14. Alternatively, latch 18 can be placed between adjacent ends of V-band segment 14 and mount plate 12. Latch 18 can be any threaded connection. Some examples of suitable latches include a T-bolt latch, a Trunnion latch, or a T-bolt quick release latch. T-bolt and Trunnion latches may be desirable to form a strong connection among V-band segments 14 and mount plate 12 or in situations where V-band clamp 10 is undone infrequently. T-bolt quick release latches are easier to engage and disengage then T-bolt or Trunnion latches and can form a sufficiently strong connection. T-bolt quick release latches therefore can be desirable where V-band clamp 10 is undone with some regularity (e.g., for purposes of performing maintenance on a part secured by V-band clamp 10). Although one latch 18 is shown with respect to FIG. 1, multiple latches could be used in V-band clamp 10.

FIG. 1 illustrates one embodiment of V-band clamp 10, in which mount plate 12 and V-band segments 14 connect to each other and form V-band clamp 10. As shown in FIG. 1, V-band clamp 10 has a square profile which is formed from three V-band segments 14 and mount plate 12. In other embodiments V-band clamp 10 can have another polygonal profile formed from a plurality of mount plates 12 and one or more V-band segments 14. Mount plate 12 could also be articulated to include a plurality of V-band segments 14. In yet other embodiments, V-band clamp 10 can be formed from mount plate 12 having a semi-circular shape and another V-band segment 14 also having a semi-circular shape. The two components would be joined by link 16 and latch 18. V-band clamp 10, in this instance, would have a generally circular profile. Circular V-band clamps are sometimes referred to as clamshell V-band clamps. In yet another embodiment, V-band clamp 10 could be formed from one V-band segment 14 having a first and a second end that are joined by latch 18. These V-bands are sometimes referred to as strap V-bands. In this instance mount plate 12 can form a portion of V-band segment 14.

Some embodiments of V-band clamp 10 do not include mount plate 12. In those embodiments V-band clamp 10 is formed from one V-band segment 14 having two ends joined by latch 18 or from a plural number of V-band segments 14 joined by latch 18 and link 16. V-band segment 14, in these embodiments will include coupling elements so that V-band clamp 10 can be attached to a third component.

In the embodiment shown in FIG. 1, however, mount plate 12 is a first V-band segment 14 of V-band clamp 10. Mount plate 12 additionally is load bearing. Mount plate 12 is also mountable to a third component. As discussed earlier, V-band clamp 10 receives two mating flanges which form a V-flange. V-band clamp 10 is tightened about the V-flange using latch 18. Each of the two mating flanges can belong to a respective first and second component. Therefore V-band clamp 10 can secure two components to each other. To better demonstrate how V-band clamp 10 functions, reference is made to FIG. 2 with continued reference to FIG. 1.

Figure 2:
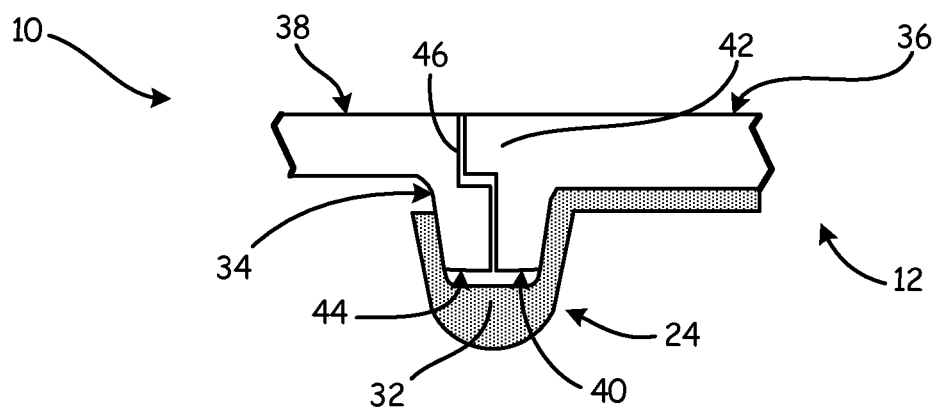
FIG. 2 is a cross-sectional view of a V-band clamp.

FIG. 2 is a cross sectional view of V-band clamp 10 showing mount plate 12 and V-flange 34. As described above, mount plate 12 includes integrated V-band 24 which defines V-groove 32. V-flange 34 has a V-shaped contour formed from flanges of first component 36 and second component 38. First component 36 and second component 38 can be many flanged components including flanged ducts or flanged plumbing components. First component 36 includes first flange 40 having projection 42. Second component 38 includes second flange 44 having recess 46. When first flange 40 and second flange 44 are in mating engagement, projection 42 engages recess 46. This arrangement can help to stabilize the connection between the two flanges against axial displacement. Together first flange 40 and second flange 44 form V-flange 34. As depicted, V-groove 32 in integrated V-band 24 is dimensioned to fit V-flange 34.

When latch 18 (not shown in FIG. 2) is tightened or torqued, mount plate 12 and V-band segments 14 (not shown in FIG. 2) apply an inward radial force to V-flange 34. This force compresses first flange 40 and second flange 44 together. The force that is applied is uniform across V-flange 34. Because the inward radial force is uniformly applied to first and second flanges 40 and 44, a good seal is formed between the flanges. To further illustrate the invention, an embodiment of V-band clamp 10 will be described below with reference to FIGS. 3, 4A, 4B, and 5 where V-band clamp 10 is used to secure two components of an air oil cooler (AOC) used in a gas turbine engine.

Figure 3:
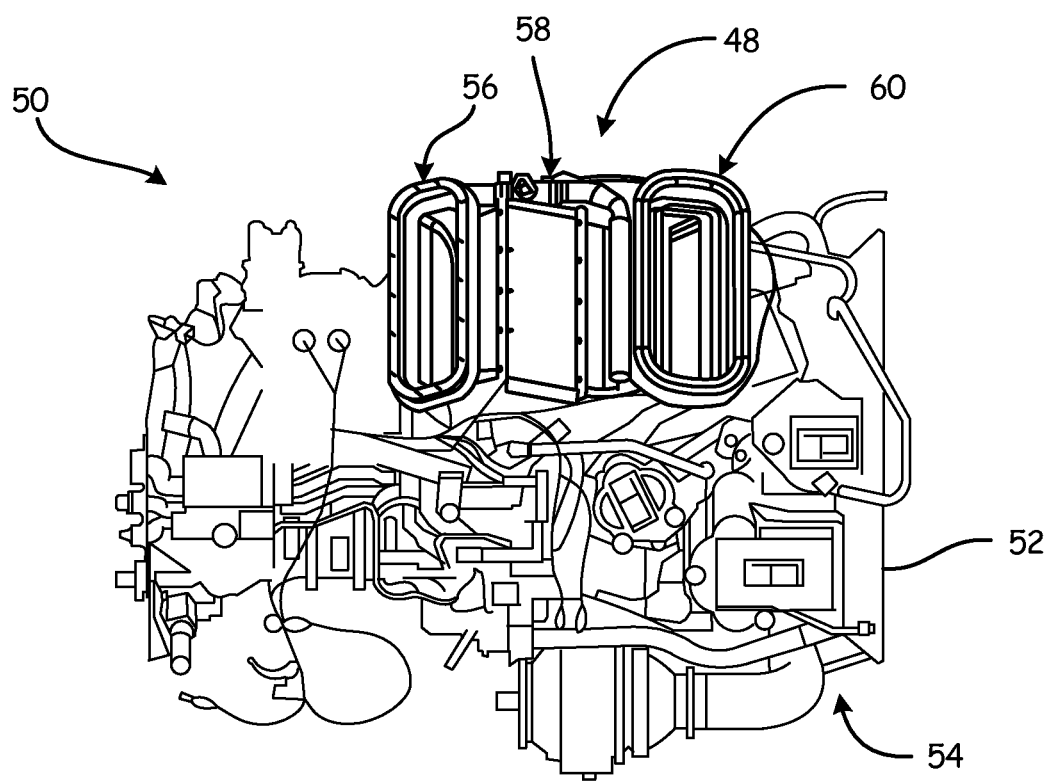
FIG. 3 is a side plan view of an air oil cooler mounted on an external surface of a gas turbine engine.

FIG. 3 is a side plan view showing AOC 48, core 52, and bypass duct 54 of gas turbine engine 50. AOC 48 includes inlet duct 56, heat exchanger 58, and outlet duct 60. Heat exchanger 58 is formed from a number of thin sheets of metal that are surrounded by an aluminum case. Both inlet duct 56 and outlet duct 60 are formed from steel. AOC 48 is mounted on gas turbine engine core 52 and is disposed within bypass duct 54. Bypass duct 54 is defined between an outer surface of engine core 52 and an inner surface of a gas turbine engine cowling (not shown) which circumscribes and is spaced from outer surface of engine core 52. In operation, AOC 48 cools oil that is heated within gas turbine engine 50. To cool the oil, AOC 48 takes in bypass air flow through inlet duct 56. The air interacts with oil in heat exchanger 58. Heat from the oil is transferred to the air, which exits AOC 48 through outlet duct 60 and re-enters the bypass flow. Having described, generally, the operation of AOC 48, reference will be made to FIGS. 4A, 4B, and 5 which show an embodiment of V-band clamp 10 used in conjunction with AOC 48.

Figure 4A:
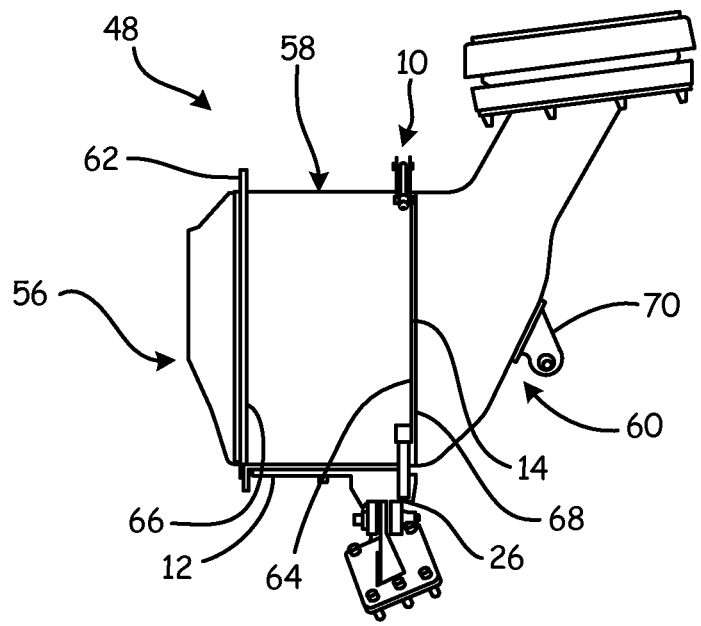
FIG. 4A is a side plan view of the air oil cooler broken away from the core.

FIG. 4A is a side plan view of AOC 48 broken away from core 52. FIG. 4A shows V-band clamp 10 and AOC 48. As described above with respect to FIG. 1, V-band clamp 10 includes mount plate 12 and V-band segments 14. Mount plate 12 also includes mount plate devises 26. As described above with respect to FIG. 3, AOC 48 includes inlet duct 56, heat exchanger 58, and outlet duct 60. Inlet duct 56 includes inlet duct flange 62. Heat exchanger 58 includes first heat exchanger flange 64 and second heat exchanger flange 66. Outlet duct 60 includes outlet duct flange 68 and outlet duct devises 70.

First heat exchanger flange 64 and outlet duct flange 68 are configured to engage each other. When first heat exchanger flange 64 and outlet duct flange 68 are engaged the flanges (as shown in FIG. 2) form V-flange 34. First heat exchanger flange 64 and outlet duct flange 68, are secured to each other using V-band clamp 10. Second heat exchanger flange 66 engages inlet duct flange 62. Second heat exchanger flange 66 and inlet duct flange 62 can be secured using a V-band clamp or by bolting the flanges together.

Figure 4B:
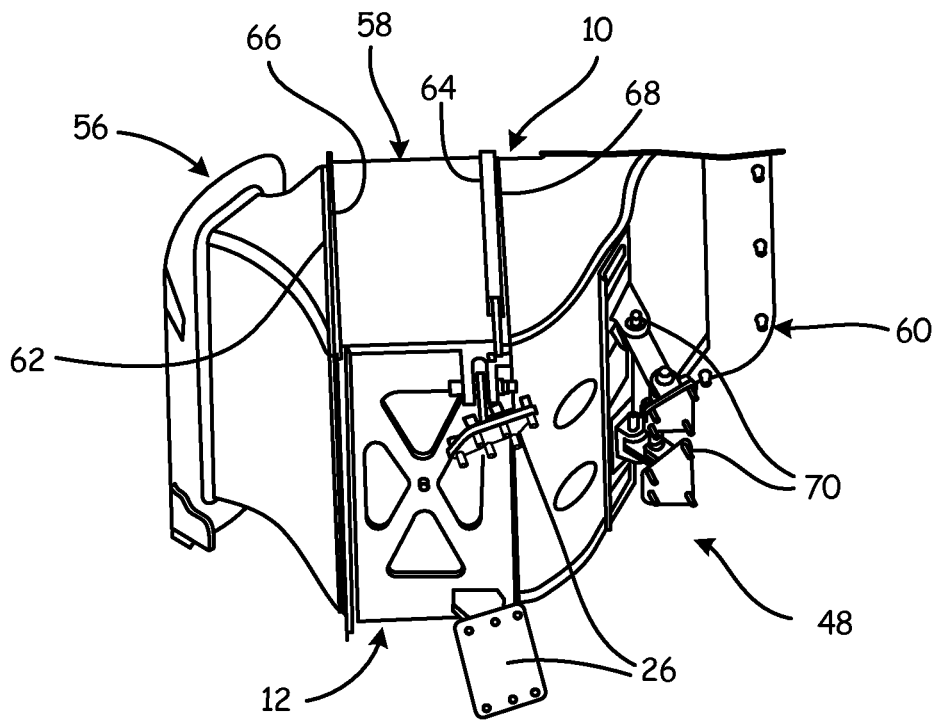
FIG. 4B is a bottom perspective view of the air oil cooler broken away from the core.

FIG. 4B is a bottom perspective view of AOC 48 broken away from core 52. The same components with respect to FIG. 4A are shown, but mount plate 12 is shown more clearly. Mount plate 12 is joined to core 52 by mount plate devises 26. As described above with respect to FIG. 1 mount plate 12 is a planar load-bearing structure and supports heat exchanger 58. Heat exchanger 58 is joined to mount plate 12 by tightening latch 18 of V-band clamp 10 which then biases heat exchanger 58 against mount plate 12. Outlet duct 60 is joined to heat exchanger 58 by V-band clamp 10 and can be joined to core 52 by outlet duct devises 70.

Figure 5:
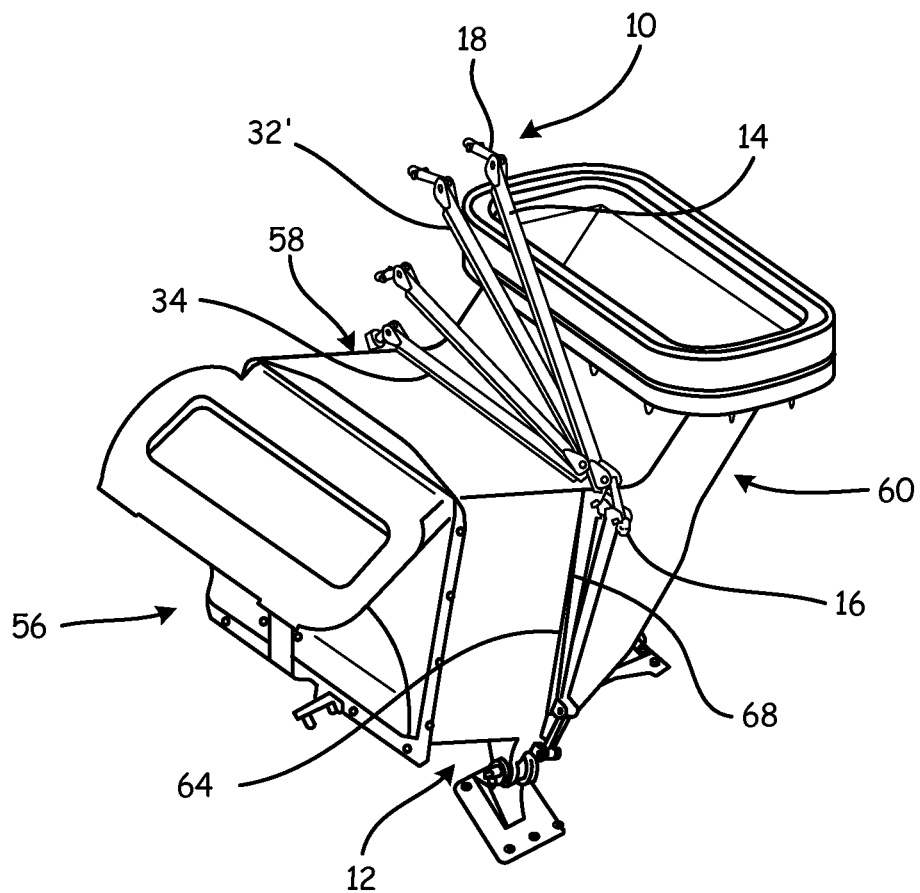
FIG. 5 is a side perspective view of the air oil cooler as a V-band segment is placed around the flange formed by a heat exchanger and an outlet duct.

FIG. 5 shows V-band clamp 10 as it is positioned about V-flange 34 formed by first heat exchanger flange 64 and outlet duct flange 68. FIG. 5 shows the same components as described above with respect to FIGS. 1, 2, 3, 4A, and 4B. As shown in FIG. 5, V-band segments 14 and mount plate 12 are positioned about V-flange 34 so that V-flange 34 is positioned within V-grooves 32 and 32'. V-band segments 14 and mount plate 12 generally circumscribe V-grooves 32 and 32' except for some spaces where link 16 and latch 18 are disposed. Latch 18 is secured to a free end of V-band segment 14. Latch 18 can be positioned at a point along V-band clamp 10 distal to mount plate 12 which is located on the bottom of heat exchanger 58. Latch 18 is then tightened or torqued to removably secure the connection between heat exchanger 58 and outlet duct 60.

As described above, V-band clamp 10 is used with AOC 48 to join heat exchanger 58 and outlet duct 60. V-band clamp 10 can also be used to secure almost any flanged components together and is not limited to AOC 48 or ducted components of gas turbine engine 50.

Figure 6:
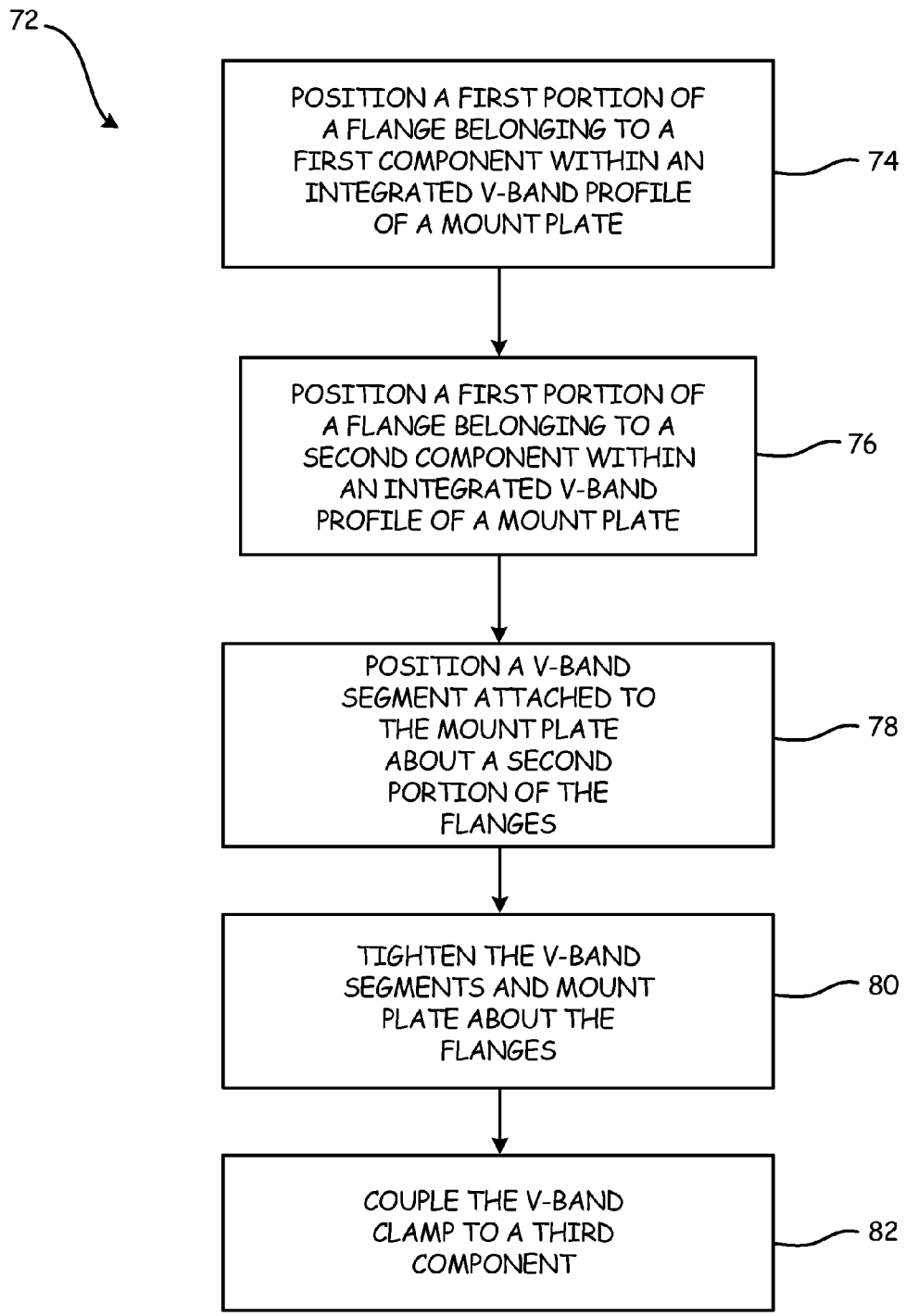
FIG. 6 is a flow diagram showing an embodiment of a method for securing a first component to a second component.

To demonstrate the applicability of V-band clamp 10 to flanged components generally, method 72 for joining two flanged components is described with respect to FIG. 6.

FIG. 6 is a flow diagram illustrating one embodiment of a method for removably a first component to a second component. This embodiment of method 72 is described with reference to some of the features illustrated in FIGS. 1 and 2. Method 72 includes positioning steps 74, 76, and 78, and tightening step 80. In positioning step 74, a first portion of first flange 40 belonging to first component 36 is positioned within integrated V-band 24 of mount plate 12. In positioning step 76, a first portion of second flange 44 belonging to second component 38 is positioned within integrated V-band 24. In positioning step 78 V-band segment 14, which is attached to mount plate 12, is positioned about a second portion of flanges 40 and 44. In tightening step 80, V-band clamp 10 is tightened. In coupling step 82, V-band clamp 10 is mounted to a third component. V-band clamp 10 can be tightened using latch 18. To remove first component 36, latch 18 is loosened and V-band segment 14 is removed from the second portions of flanges 40 and 44. First component 36 can then be removed from mount plate 12 directly.

There are many reasons to use V-band clamp 10 to secure two flanged components together including the following non limiting examples. For example, securing and sealing V-band flange 34 using V-band clamp 10 can be preferable compared to bolting first heat exchanger flange 64 and outlet duct flange 68 together. This is the case for a couple of reasons. First, if first heat exchanger flange 64 and outlet duct flange 68 were bolted together each bolt would have to be individually torqued. This can be time consuming and tedious for a mechanic or technician. To install a flanged component, such as heat exchanger 58, using V-band clamp 10, however, a mechanic or technician only has to place heat exchanger 58 on mount plate 12 and ensure that first heat exchanger flange 64 is positioned within integrated V-band 24. Outlet duct flange 68 is then positioned in integrated V-band 24 and V-band clamp 10 is secured using latch 18. If mount plate 12 is on the bottom of heat exchanger 58 and latch 18 is positioned at or near the top of heat exchanger 58 as shown in FIGS. 1, 3, 4A, 4B, and 5, a mechanic or technician will have easy access to latch 18.

Additionally, it is difficult to produce a uniform seal about first heat exchanger flange 64 and outlet duct flange 68 using bolts compared to using V-band clamp 10. This is because it can be difficult to uniformly torque each bolt. Because of the uniform force applied to those flanges by tightening latch 18, V-band clamp 10 creates a uniform seal about first heat exchanger flange 64 and outlet duct flange 68.

Another reason to use V-band clamp 10 is because mount plate 12 can provide a platform for heat exchanger 58 to rest on before or after latch 18 has been loosened. This can help make it easier for mechanic or technician to remove or install heat exchanger 58. For example, if heat exchanger 58 is directly attached to core 52, then when the bolts holding mount plate devises 26 to core 52 are removed, heat exchanger 58 would have to be immediately stabilized to prevent heat exchanger 58 from falling off core 52. Other devices or assemblies used to stabilize heat exchanger 58 would likely create a more cluttered environment for the mechanic or technician to work in. Here, in contrast, heat exchanger 58 can rest on mount plate 12 after latch 18 is loosened.

A further reason to use V-band clamp 10 is that the components of V-band clamp 10 remain on gas turbine engine 50 either during installation of heat exchanger 58 on mount plate 12 or during removal of heat exchanger 58 from mount plate 12. This is because mount plate 12 remains attached on core 52 and V-band segments 14, link 16 and latch 18 remain attached to mount plate 12. Because these parts remain attached to gas turbine engine 50, the risk of losing a loose part during installation or removal of heat exchanger 58 is low. Because parts such as bolts can easily be misplaced when removed from a component, this is especially true compared to systems where separating flanged components requires removing the bolts holding the flanges together.

Beyond reducing the risk of merely losing a part, such as a bolt, the ability of V-band clamp 10 to remain attached to core 52 reduces the risk of foreign object damage in gas turbine engine 50. This type of damage results from an object such as a bolt being located in a section of gas turbine engine 50 that it is not supposed to be in. For example, if first heat exchanger flange 64 and outlet duct flange 68 were joined using bolts and one bolt was dropped into a region of gas turbine engine 50 during installation or removal of heat exchanger 58 and not recovered, that bolt could cause damage to the engine during operation. Damage could result from the bypass flow coming from the engine fan which could cause a bolt to move at a high velocity and impact the external surface of core 52. The impact of the bolt on the external surface of core 52 could cause potentially significant damage to the engine.

Yet a further reason to use V-band clamp 10 is that mount plate 12 can provide additional support for heavy components mounted to gas turbine engine 50. For example, heat exchanger 58 can be a large component and can be very heavy when it contains a large amount of oil. If mount plate devises 26 where directly mounted to heat exchanger 58 and to core 52, heat exchanger 58 could exert a high amount of strain on mount plate devises 26 as a function of the load placed on them. Mount plate 12, however, provides a large surface area that can disperse the load imparted by heat exchanger 58 through mount plate 12 and mount plate devises 26.

Another reason to use mount plate 12 in conjunction with heat exchanger 58 is because mount plate 12 can help to reinforce the structure of heat exchanger 58. As described above, heat exchanger 58 can be formed from a plurality of metal sheets surrounded by an aluminum sheet. heat exchanger 58 can be damaged by sudden punch or shock loads such as those caused by a blade-out event in gas turbine engine 50. A blade-out event can occur when a blade experiences mechanical failure due to fatigue or foreign object damage. Because mount plate 12 is configured to be load bearing, however, it is constructed from a durable material which is more likely to withstand damage from a sudden punch or shock load. Therefore, if such a load impacts mount plate 12 the damage to heat exchanger 58 is likely to be less severe than it would be without mount plate 12.

V-band clamp 10 can also help in mistake proofing the installation of heat exchanger 58. That is, first heat exchanger flange 64 and integrated V-band 24 can be sized to only engage each other. A mechanic or technician, therefore, will not be able to engage any other flanged component with integrated V-band 24. Additionally V-band segments 14 and integrated V-band 24 can be configured to receive a specific portion of V-flange 34 which can help orient heat exchanger 58 to achieve a desired clocking of heat exchanger 58.

DISCUSSION OF POSSIBLE EMBODIMENTS

The following are non-exclusive descriptions of possible embodiments of the present invention.

A V-band clamp according to an exemplary embodiment of this disclosure, among other possible things can include a V-band segment having a V-groove and can be configured to generally circumscribe a flange of a first component and a flange of a second component the V-band segment can have a coupling element configured to couple the V-band clamp to a third component; and a latch disposed on the V-band segment that is configured to tighten the V-band clamp about the flanges.

The V-band clamp of the preceding paragraph can optionally include, additionally and/or alternatively, any one or more of the following features, configurations and/or additional components:

A further embodiment of the foregoing V-band clamp, wherein coupling element includes a clevis.

A further embodiment of the foregoing V-band clamp, wherein the coupling element comprises a tab.

A further embodiment of the foregoing V-band clamp, wherein the mount plate can be articulated to comprise a plurality of V-band segments.

A further embodiment of the foregoing V-band clamp, wherein the coupling feature can be disposed at a position along a circumference of the V-band clamp distal to the latch.

A mount plate according to an exemplary embodiment of this disclosure, among other possible things can include the following. An integral V-band defining a V-groove configured to receive a first portion of a flange belonging to a first component and a first portion of a flange belonging to a second component and a mount surface extending from the integral V-band and configured to at least partially support the first component.

The mount plate of the preceding paragraph can optionally include, additionally and/or alternatively, any one or more of the following features, configurations and/or additional components:

A further embodiment of the foregoing mount plate, wherein the mount plate can be a first V-band segment of a V-band clamp.

A further embodiment of the foregoing mount plate, wherein the mount plate further includes a second V-band segment of the V-band clamp in which the second segment can be attached to the mount plate and can be configured to be positioned about a second portion of the flange belonging to the first component and a second portion of the flange belonging to the second component.

A further embodiment of the foregoing mount plate, wherein the mount plate can further include a latch for joining the two V-band segments.

A further embodiment of the foregoing mount plate, wherein the first component can be a heat exchanger in a gas turbine engine and the second component can be an outlet duct in a gas turbine engine.

A further embodiment of the foregoing mount plate, wherein the mount plate can be a load bearing structure.

A further embodiment of the foregoing mount plate, wherein the mount plate can include a clevis for attaching the mount plate to an external surface of a gas turbine engine core.

A method for removably securing a first component to a second component according to an exemplary embodiment of this disclosure, among other possible things can include the following steps. A first portion of a flange belonging to a first component can be positioned at least partially within a V-band segment. A first portion of a flange belonging to a second component can be positioned at least partially within the V-band segment. The V-band segment can be positioned about a second portion of the flanges belonging to the first and second components in which the V-band segment forms a V-band clamp. The V-band clamp can then be tightened. The V-band clamp is then mounted to a third component.

The method of the preceding paragraph can optionally include, additionally and/or alternatively, any one or more of the following features, configurations and/or additional components:

A further embodiment of the foregoing method, wherein the first component can be a heat exchanger in a gas turbine engine and the second component can be an outlet duct in a gas turbine engine.

A further embodiment of the foregoing method, wherein the third component is a gas turbine engine core.

A further embodiment of the foregoing method, wherein the V-band clamp can be tightened using a latch.

A further embodiment of the foregoing method, wherein the method can include the further steps of loosening the V-band clamp, removing the V-band segment from the second portion of the flanges of the components, and removing the first component from the V-band segment.

A further embodiment of the foregoing method, wherein the V-band segment can remain mounted to the third component after the first component is removed.

A further embodiment of the foregoing method, wherein the first and second components can be ducts.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A V-band clamp comprising:
   a mount plate that includes along an edge thereof a longitudinally extending V-groove and a mount portion at each end of the V-groove, the V-groove configured to receive a first portion of a flange belonging to a first component and a first portion of a flange belonging to a second component;
   a plurality of V-band members each having a longitudinally extending V-groove and a mount portion at each opposing end of each V-groove; and
   a plurality of coupling elements configured to couple at least two of the V-band members to each other and at least one of the V-band members to the mount plate, thereby aligning the V-grooves of the V-band members with the V-groove of the mount plate;
   wherein at least one of the plurality of coupling elements comprises a latch configured to removably connect at least two adjacent mount portions and to tighten the V-band clamp
   wherein the mount plate further includes a clevis configured to couple the V-band clamp to a third component that is physically separate from the V-band clamp and the first and second components.

2. The V-band clamp of claim 1, wherein the mount plate is articulated to comprise the plurality of V-band members.

3. The V-band clamp of claim 1, wherein the clevis is disposed at a position of the V-band clamp distal to the latch.

4. The V-band clamp of claim 1, wherein the mount plate comprises:
   an integral V-band defining the longitudinally extending V-groove; and
   a mount surface extending from the integral V-band and configured to at least partially support the first component.

5. The V-band clamp of claim 4, wherein at least one of the plurality of V-band members is configured to be positioned about a second portion of the flange belonging to the first component and a second portion of the flange belonging to the second component.

6. The V-band clamp of claim 4, wherein the first component is a heat exchanger in a gas turbine engine and the second component is an outlet duct in a gas turbine engine.

7. The V-band clamp of claim 4, wherein the mount plate is a load bearing structure.

* * * * *

UNITED STATES PATENT AND TRADEMARK OFFICE
CERTIFICATE OF CORRECTION

PATENT NO.        : 9,874,147 B2
APPLICATION NO.   : 14/600771
DATED             : January 23, 2018
INVENTOR(S)       : Nathan Snape, Matthew Howlett and Steven Dill Page 1 of 1

It is certified that error appears in the above-identified patent and that said Letters Patent is hereby corrected as shown below:

Column 2, Line 26:
Delete "devises 26"
Insert --clevises 26--

Column 2, Line 57:
Delete "devises 26"
Insert --clevises 26--

Column 2, Line 59:
Delete "devises 26"
Insert --clevises 26--

Column 2, Line 61:
Delete "devises 26"
Insert --clevises 26--

Column 2, Line 63:
Delete "devises 26"
Insert --clevises 26--

Column 5, Line 1:
Delete "devises 26"
Insert --clevises 26--

Column 5, Line 7:
Delete "devises 26"
Insert --clevises 26--

Signed and Sealed this
Twenty-ninth Day of May, 2018

Andrei Iancu
*Director of the United States Patent and Trademark Office*